March 8, 1966     E. N. WILLIE     3,239,814
DOCUMENT TESTING AND IDENTIFICATION SYSTEM
Filed Feb. 14, 1962     2 Sheets-Sheet 2

*INVENTOR.*
EDWARD N. WILLIE
BY *Darby & Darby*
ATTORNEYS

United States Patent Office 3,239,814
Patented Mar. 8, 1966

3,239,814
DOCUMENT TESTING AND IDENTIFICATION
SYSTEM
Edward N. Willie, Uniondale, N.Y., assignor to Lionel
Electronics Laboratories, Inc., Brooklyn, N.Y., a corporation of New York
Filed Feb. 14, 1962, Ser. No. 173,275
9 Claims. (Cl. 340—149)

This invention relates to a system for testing selected characteristics of pieces of material and more patricularly to a system for the testing and identification of documents by their light transmission or reflectance characteristics.

There are many instances in which it is necessary to test various characteristics of pieces of material such as documents, printed matter, etc. One such case is where the document is a piece of currency and it is desired to determine the denomination of the particular piece of currency and to check whether or not it is genuine. Other typical instances include identification of stocks, bonds, tickets, security passes, scrip and/or other types of printed matter.

As a general proposition, every document of the same type has certain distinguishing characteristics which makes it unique with respect to all other documents of different types or classes. As an illustrative example, it can readily be seen that the printing on the faces of various denominations of United States paper currency is different for each of the denominations and the printing for each denomination of currency also differs from every other document. These differences include the printed subject matter, size and location of the light, dark and shaded areas, color, and combinations of these factors.

In view of the existing differences in printing between documents and the printed characteristics which are unique to one particular type of document, it is possible to check any piece of material to determine whether or not it is of a particular type, and therefore acceptable, by testing its light transmission or reflectance characteristics. If a piece of material meets the criteria of the light tests which are established to identify a certain type of material then it is determined that it is of the certain type and is presumably genuine. For example, a one dollar bill can be identified from among bills of other denominations and other kinds of documents since its light transmission or reflectance characteristics are unique.

The present invention relates to an electronic circuit for testing documents in order to identify them by their light transmission or light reflectance characteristics as being of a certain type and therefore being acceptable. In accordance with the invention, a plurality of single photocells or pairs of photocells are located adjacent selected points of the document under test and these photocells produce output signals dependent upon the amount of light transmitted through or reflected from the document. This, of course, depends upon the printing on the bill and its shading. The output signals from each of the photocells or photocell pairs are applied to respective scaling amplifiers whose amplification characteristics are adjusted to produce an output signal of predetermined amplitude and polarity if the photocell is sensing the correct amount of light for the document of the particular type which is to be identified. If the document is of another type, the amplifier output signal will have a different amplitude and/or polarity dependng upon the area of the document that is sensed. Some of the amplifiers are constructed with two outptus so that output signals of both positive and neagtive polarity can be derived therefrom at the same time, while other amplifiers have only a single output.

A plurality of logic switching circuits, preferably multivibrators are provided and the positive polarity output of one amplifier and the negative polarity output of another amplifier are connected thereto. If the polarities and amplitudes of the two signals applied to each switching circuit is correct, meaning that the light measured by each photocell was the correct amount for the particular type of document to be identified, each switching circuit will be triggered and produce an output signal. This means that the light transmission or reflectance characteristics of two points on the document were compared and found to be correct. In some cases the positive and/or negative outputs from the same amplifier are used as the inputs for two or more switching circuits so that a crosscheck is performed in the switching circuits for certain of the points on the document that are sensed.

The outputs of the logic switching circuits are in turn applied to the inputs of an AND type circuit which produces an output signal only when all of signals at its inputs are present and are of the proper type. In a preferred embodiment of the invention, one of the logic switching circuits is designed not to be triggered in response to signals from an acceptable document and this negative indication must also appear at the input to the AND circuit. This acts as a safeguard since if this negative indication is not produced then the document is considered to be of a different type from the certain type being identified and therefore not acceptable. Similarly, if one or more of the other switching circuits is not triggered, then the AND circuit will not be activated. This also means that the document being tested is not acceptable. When the AND circuit produces an output signal this is an indication that the document under test has the proper light transmission and/or reflectance characteristics which identify it as an acceptable document of a particular type being looked for, for example, a genuine bill of a certain denomination. All other types of documents do not energize the AND circuit and therefore are rejected.

The circuit of the present invention has several advantages. First of all, it is relatively fast acting. Approximately 10–50 microseconds is all that is needed to energize the photocells and produce an output signal indicating whether the document is acceptable or not. This enables the circuit to be used with machines in which the document is tested while it is moving on a belt or tray. Also, the circuit places emphasis on determining the document light transmission or reflectance characteristics by polarity and amplitude of output signal rather than signal amplitude alone. Actually, more emphasis is given to polarity of signal than amplitude. This is an advantage since it prevents wrong answers from occurring due to just the normal aging of circuit components which would change the amplitude of the amplifier output signals. It should also be recognized that by suitable placement of the photocells with respect to the document under test and/or by adjusting the scaling factor of each amplifier that almost any type of document can be accommodated, for example, one dollar, five dollar, ten dollar, and twenty dollar bills, etc.

It is therefore an object of this invention to provide an electronic circuit used for identifying pieces of material such as documents by means of their light transmission and/or reflectance characteristics.

Another object of the invention is to provide a photocell sensing circuit for identifying documents which has a number of logic circuits for comparting the various photocell output signals in a predetermined manner.

A further object of the invention is to provide a circuit for identifying documents by testing their light transmission characteristics in which a plurality of amplifiers are provided and each amplifier produces an output signal of a predetermined amplitude and polarity if an acceptable document is under test.

Still another object of the invention is to provide a photocell testing circuit for identifying documents in which the light transmission characteristics of several areas of the document under test are compared with each other.

Other objects and advantages of the present invention will become more apparent upon reference to the following specification and annexed drawings in which.

Figure 1:
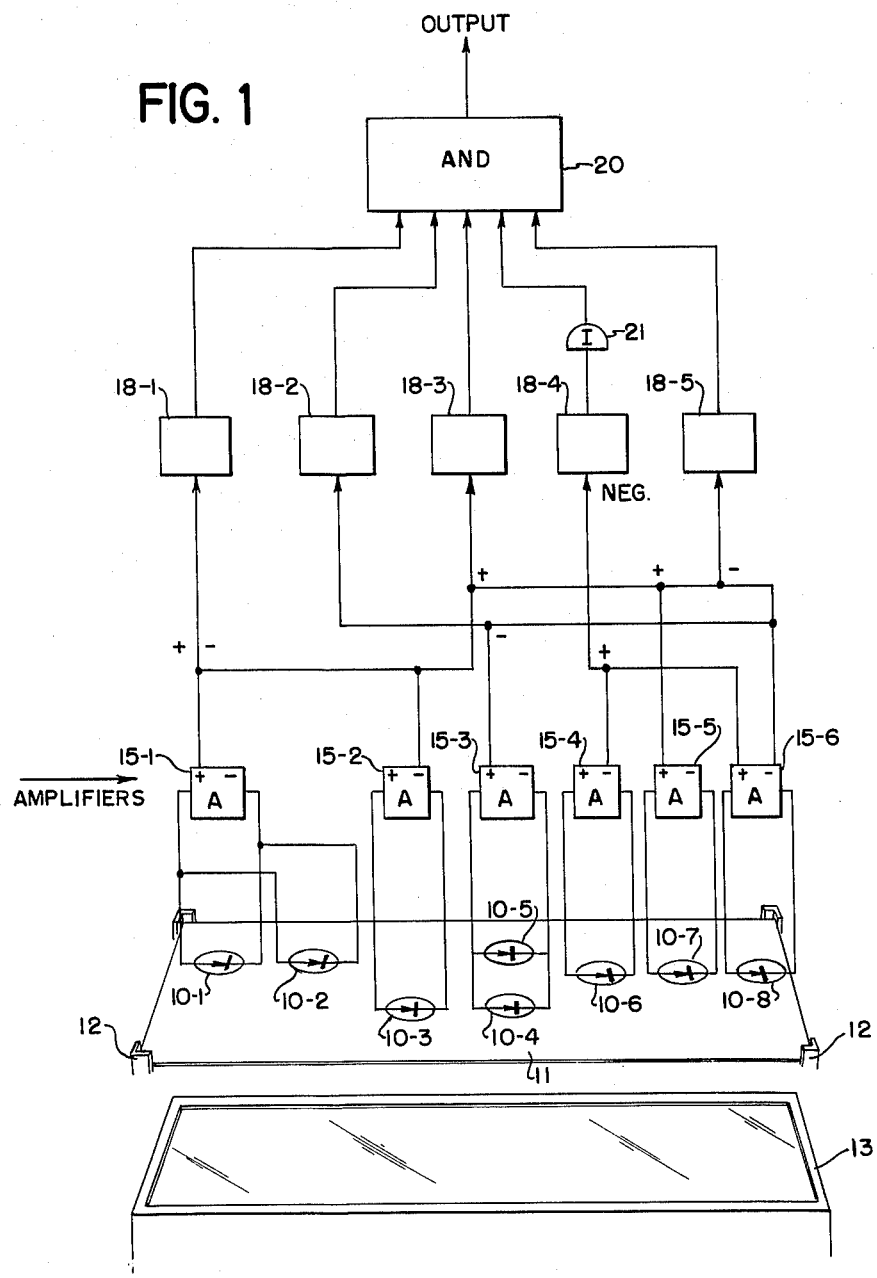
FIGURE 1 is a general diagram showing the overall operation of a system.

Referring to FIGURE 1, a plurality of photocells 10–1, 10–2, . . . 10–8 are located adjacent different points or areas of a document 11 which is under test in a testing area defined by the boundaries 12. Located beneath the document 11 is a light source 13 which, when energized, produces light which passes through the document and impinges upon the photocells. A mask may be provided adjacent the photocells to narrow the area from which each photocell receives a light signal. With the present system, the light need only be flashed for about 10 microseconds. While the system as described with respect to a light transmission test, it should be realized that a light reflection test will work just as well.

Depending upon the nature of the document, that is, the document light and dark areas which are adjacent the various photocells 10–1—10–8, each photocell produces an output signal in accordance with the amount of light impinging on it. The photocells are placed with respect to the document examining area 12 so that each photocell should receive a predetermined amount of light if the document is an acceptable one of the certain type to be identified. Of course, if a different type document is placed in the examining area, then each photocell will not receive the predetermined amount of light.

As shown in FIGURE 1, photocells 10–1 and 10–2 are located adjacent different points of the document but their respective outputs are connected in parallel. This means that the signals from these two photocells are added before they are processed further. Photocells 10–4 and 10–5 are also connected in parallel and preferably spaced over two selected portions of the document which have approximately the same light transmission characteristics so that the sum of the signals from the two photocells should be at a certain magnitude if the current document is being examined.

The output from each of the photocells or photocell pairs is applied to the input of a respective amplifier. As shown in FIGURE 1, the outputs of photocells 10–1 and 10–2 are applied in parallel to the input of amplifier 15–1; the output of photocell 10–3 to the input of amplifier 15–2; the outputs of parallel connected photocells 10–4 and 10–5 to the input of amplifier 15–3; the output of photocell 10–6 to the input of amplifier 15–4; the output of photocell 10–7 to the input of amplifier 15–5; and the output of photocell 10–8 to the input of amplifier 15–6. Each of the amplifiers 15–1 to 15–6 is of a similar type and is capable of producing either a positive or a negative polarity output signal, or both, in response to the correct input signal from the connected photocell. This is indicated in each of the blocks by the + and − signs. This can be accomplished by using a vacuum tube amplifier and taking the output off of the plate or off the cathode or both, or by using transistors and taking the output off the emitter electrode and/or the collector electrode or both.

Each of the amplifiers 15 is also designed to have a different gain factor so that in response to a signal of correct magnitude from the photocells, which occurs when an acceptable document is being examined, the output signal at each positive or negative output of the amplifier is of substantially the same magnitude although opposite in polarity. To explain this, consider that photocell 10–7 is spaced adjacent a light portion of a document 11 of the same type as that to be identified and the photocell 10–8 is spaced adjacent a dark portion. In this case the output signal of photocell 10–7 would be greater than the output signal of photocell 10–8. However, this is the condition which is supposed to prevail when an acceptable document is being checked. To make the output signals from amplifiers 15–5 and 15–6 the same in response to the different input signals, it is necessary to set the gain of each of these amplifiers. This can readily be accomplished, for example, by changing the plate and cathode impedance loads in vacuum tubes, or changing the emitter and collector impedances in transistors.

The outputs of the amplifiers 15–1 to 15–6 are connected in a predetermined manner to the inputs of switching circuits 18–1, 18–2, 18–3, 18–4, and 18–5. As can be seen, the input of each of the switching circuits is connected to the positive output of one of the amplifiers 15 and the negative output of another amplifier. For example, the positive output from amplifier 15–1 and the negative output from amplifier 15–2 are connected to switch 18–1. Also the positive output from amplifier 15–3 and the negative output from amplifier 15–6 are connected to the input of circuit 18–2 while the negative output of amplifier 15–2 and the positive output of amplifier 15–5 are connected to switching circuit 18–3. Similarly, circuit 18–4 has connected thereto the negative output from amplifier 15–4 and the positive output from amplifier 15–6, while circuit 18–5 has the positive output from amplifier 15–5 and the negative output from amplifier 15–6. Therefore each switching circuit has its input connected to a positive and a negative output of two different amplifiers which receive signals from photocells located to test two or more different points on the document being examined. If the test was affirmative or acceptable, meaning that the document identified was one of the type that the circuit is preset to identify, then the positive and negative signals will appear at the input to each of the switching circuits. These signals should be of substantially the same magnitude and therefore balance each other out. When this condition occurs, the switching circuit is triggered and produces an output signal.

If desired, one of the switches can be arranged so that it will not be triggered when an acceptable document is being tested. This can be used as a negative check to insure that an acceptable document is being examined. For example, in a typical case, switch 18–4 might be set in this manner. Therefore, when an acceptable document is being tested the signals from the negative output of amplifier 15–4 and the positive output of amplifier 15–6 should be of such a magnitude and/or polarity so that switch 18–4 will not be triggered.

As described, each of the switches 18 performs a check in which the light transmitted through one portion of the document being examined is compared with the light from another portion of the document. In some cases, for example photocells 10–3, 10–7 and 10–8, the same light signal at the output of the amplifier is compared at the input of two of the switches. This provides a cross-check between one point and several other points on the bill. This type of cross-checking has been found to be highly effective in identifying various types of documents.

The output of each of the switches 18 is applied to one input of an AND type circuit 20. This circuit produces an output signal when it receives the proper input signals on each of its input lines. In this case, a five input AND circuit is used with one input connected to the output of one of the five switches 18. Since switch 18–4 produces a no or a negative assertion signal for an acceptable document, the output from this switch must be inverted if it is to be used to energize the AND circuit. This is accomplished by an inverter 21 connected between the output of switch 18–4 and the input of AND 20. When all five of the signals applied to the AND circuit inputs are correct, signifying that all of the examined points of the document had the correct amount of light transmission or reflection, AND circuit 20 will conduct and produce an output signal indicating this. This output signal may be used for any of a variety of purposes, for example, operating a change giving machine, energizing a light to tell that the document is acceptable, energizing a document removing mechanism, combinations of the foregoing, etc.

Figure 2:
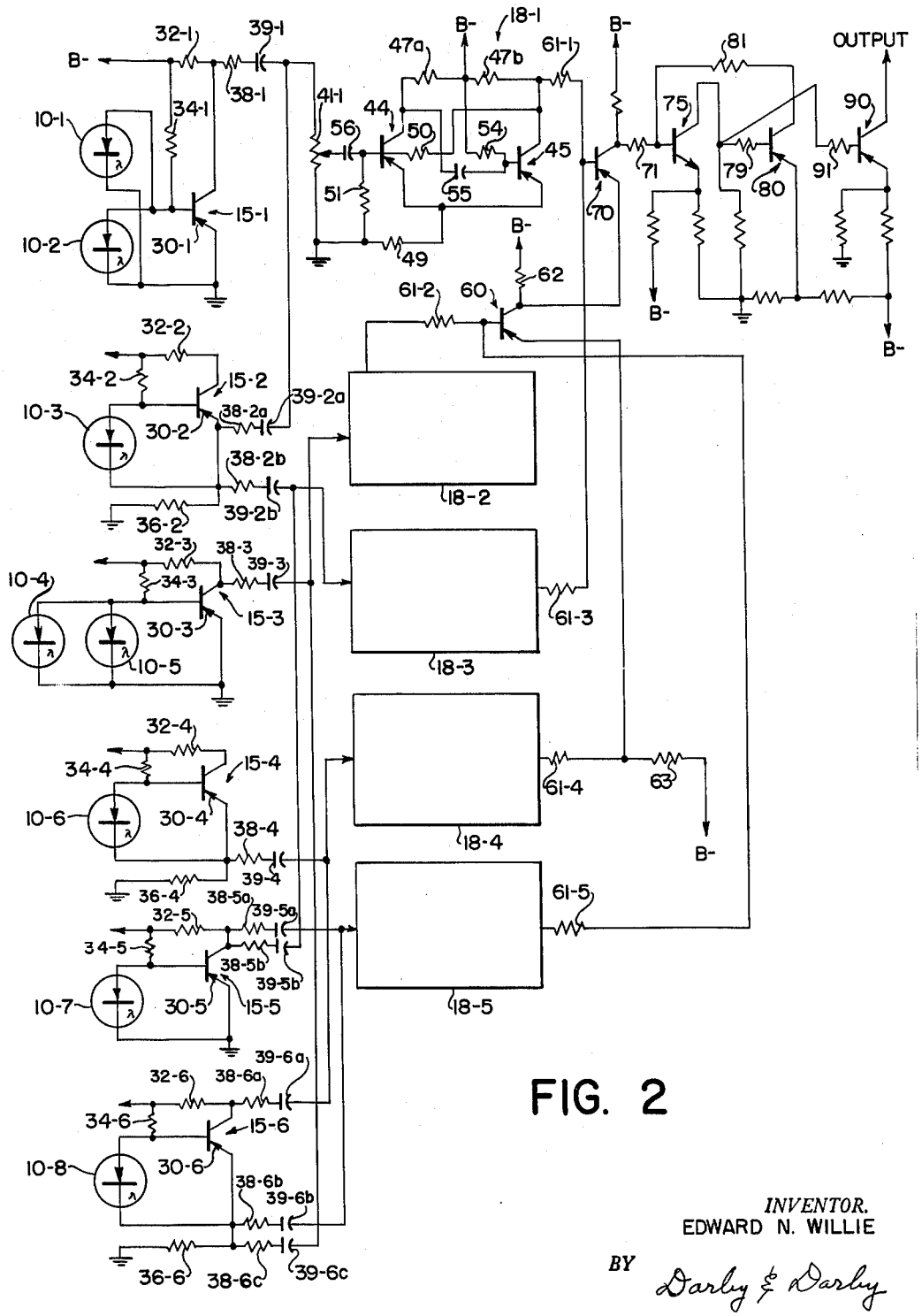
FIGURE 2 is a schematic diagram of a preferred embodiment of the electronic circuit.

Referring now to FIGURE 2, a complete circuit diagram is shown for the electronics of a system similar to the one shown in FIGURE 1. In FIGURE 2 the same reference numerals used in FIGURE 1 are applied where applicable. The outputs of photocells 10–1 and 10–2 are connected in parallel to amplifier 15–1 between the base electrode and grounded emitter electrode of a PNP transistor 30–1. Photocells 10–1 and 10–2, as are all the other photocells, are preferably of the silicon type although other suitable types may be used. The photocells are connected in a manner so that as more light impinges upon a photocell its resistance decreases and a larger negative going signal is applied to the base electrode of the connected transistor. Since the transistors are of the PNP type a negative going signal applied to the base electrode causes the transistor to conduct.

Transistor 30–1 has its emitter connected directly to ground and its collector electrode connected to the B-potential source through a resistor 32–1. Base electrode bias is established by resistor 34–1. As shown, transistor 30–1 has only one output which is taken from its collector electrode. As is well known, when a negative going signal is applied to the base of a PNP transistor, the collector output will go positive. Amplifier 15–2 is formed by a transistor 30–2 connected as an emitter follower with the output taken off the emitter electrode across resistor 36–2. Two output coupling networks are provided. When a negative going signal is applied to the base electrode of transistor 30–2, the output signal across resistor 36–2 also goes negative. Only one photocell 10–3 supplies the input signal for transistor 30–2 as is shown in FIGURE 1.

Amplifier 15–3 is connected in the same manner as amplifier 15–1 with only one output at the collector. Here again, parallel connected photocells are used at the amplifier input. Amplifier 15–4 is an emitter follower with only one output at the emitter electrode while amplifier 15–5 is similar to 15–2 but has two outputs taken from the collector. A single output is taken from the collector of the transistor 30–6 for amplifier 15–6 while two outputs are taken from the emitter electrode.

As described with respect to FIGURE 1, when an acceptable document is being tested the positive going (collector) output from amplifier 15–1 and the negative going (emitter) output from amplifier 15–2 are combined at the input of switch 18–1. As shown in FIGURE 2, the positive going signal from transistor 30–1 is applied to the switching circuit 18–1 through a coupling network formed by a series connected resistor 38–1 and capacitor 39–1 and the negative going signal from the emitter electrode of transistor 30–2 is applied through a similar coupling network formed by resistor 38–2a and capacitor 39–2a. These two signals are combined across a variable resistor 41–1, which is a sensitivity control, which feeds the input of switch 18–1. The other switches each receive a positive and a negative going signal from the separate transistors as shown in FIGURE 2 through the connected coupling networks. All of the switches 18 are of similar construction and all preferably have a sensitivity control 41. The capacitors 39 of the coupling network remove the direct current voltage component from the transistor output signals so that only the voltage change appearing at the transistor collector or emitter is seen at the input to each switch 18. This means that the instantaneous polarities and magnitudes of two voltages are combined across each sensitivity control 41 and not the direct current components.

The switch 18–1 responds to the magnitude and polarity of the resultant signal produced by the combination of the positive and negative going signals from amplifiers 15–1 and 15–2. Ideally, each circuit is triggered when the two signals balance each other out to produce a zero resultant voltage. In a preferred embodiment of the invention, however, the switches 18 are triggered in response to a signal which is less than a certain predetermined negative voltage which is close to zero. Stated another way, the voltage needed to trigger a switch 18 must be more negative than a certain negative voltage. A positive polarity signal produced at a switch input means that an unacceptable document is being tested and the switch will not be triggered.

Each of the switches 18 is a conventional circuit which is known in the art as a one-shot multivibrator. The circuit responds to a triggering signal to change from one state of conductivity to another state and then flips back to the initial state of its own accord after a predetermined time.

The one-shot multivibrator of FIGURE 2 has two transistors 44 and 45 which also, illustratively, are of the PNP type. Collector bias is applied to the transistors through the respective resistors 47a and 47b and the emitters are connected together and returned to ground through a common resistor 49. Transistor 44 receives base bias through a voltage divider network formed by resistors 47b, 50 and 51 while transistor 45 has its base connected to the B-potential source through resistor 54. Cross coupling is provided from the collector of transistor 44 to the base of transistor 45 through a capacitor 55. The triggering signal is coupled to the base of transistor 44 through another capacitor 56.

In operation, transistor 44 is normally non-conducting and transistor 45 is conducting. This puts the collector of transistor 45 at a low potential with respect to the B-supply voltage. When a negative triggering pulse is applied through capacitor 56 to the base of transistor 44, this transistor conducts causing its collector potential to become more positive. This positive going signal is coupled through capacitor 55 to the base electrode of transistor 45 driving it to cutoff and making its collector potential go more negative. This negative going signal is coupled back to the base of transistor 44 through resistor 50 further increasing the conductivity of transistor 44 until it is fully saturated. When this occurs transistor 45 is cutoff and its collector is almost at the B-supply potential.

With transistor 44 conducting and transistor 45 non-conducting, capacitor 55 discharges through resistor 54 and the base bias of transistor 45 becomes less positive. When the base bias of transistor 45 reaches a certain negative point transistor 45 conducts. The increase in collector potential of transistor 45 is coupled back to the base of transistor 44 through resistor 50 causing transistor 44 to become non-conducting. The original condition is restored in which transistor 44 is non-conducting and transistor 45 is in a conductive state. This stable condition is maintained until another trigger pulse is applied to the base of transistor 44.

In the switching circuit the timing for changing from one state to another is controlled by the values of capacitor 55 and resistor 54. In a preferred form of the invention, the light adjacent the document being examined is flashed for only 10 microseconds, which is enough time to produce an output at each of the amplifiers, while the time constants of the switches 18 are selected to produce a multivibrator cycle of approximately 50 microseconds. Therefore, the switches 18 form a memory circuit since they hold the information of the positive and negative signal comparison for a longer time than the information was available at their inputs.

The construction of the other switches 18–2 to 18–5 is similar to switch 18–1. Therefore, these switches are not described in detail and they are represented by the appropriate blocks.

The connections from the outputs of the amplifiers 15 to the respective switches 18 are the same as shown in FIGURE 1. Therefore, each of the switches 18-2 to 18-5 will be triggered if the two signal applied to its input are at or below the required negative value. With respect to switch 18-4, if an acceptable document is being tested, this switch should not be triggered. This can be accomplished by changing the value of the emitter resistor 36-4 and/or the coupling resistor 38-4 so that a smaller magnitude negative going signal is applied to switch 18-4. This negative going signal is not enough to balance out or overcome the positive going signal from amplifier 15-6. In this case the right hand transistor stays conducting at all times with its collector at the most positive potential. This is the opposite of all of the other switches whose right hand collectors go negative.

The AND gate of FIGURE 1 is split into two different transistor circuits in the circuit of FIGURE 2. Here, the output from switch 18-2 is connected to the base electrode of transistor 60 through a resistor 61-1. Transistor 60 is also of the PNP type and its collector is biased by a resistor 62 and its emitter by resistor 63. In the static condition transistor 60 is non-conducting. The output from switch 18-5 is applied to the base of transistor 60 through resistor 61-5 while the output of switch 18-4 is applied to the emitter electrode of this transistor through the resistor 61-4. Since transistor 60 is of the PNP type, the signal on the base must be more negative than the signal and the bias applied to the emitter in order for the transistor to conduct. When switch 18-4 is triggered, indicating an unacceptable document, transistor 60 cannot conduct under any circumstances since the righthand transistor of switch 18-4 is non-conducting thereby applying a high negative potential to the emitter. However, when the output signals of switches 18-2 and 18-5 are correct (negative) and switch 18-4 is not triggered, thereby applying a lower negative potential to the emitter electrode of transistor 60, then the first two signals will overcome the emitter bias and cause the transistor to conduct and produce a positive going output pulse.

The positive going pulse at the collector electrode of transistor 60, which is produced in response to correct signals from switches 18-2, 18-4 and 18-5, is used to establish a bias at the emitter electrode of transistor 70, which has applied to its base electrode the output signals from switches 18-1 and 18-3 through respective resistors 61-1 and 61-3. If the signals from switches 18-1 and 18-3 are sufficiently negative they overcome the positive bias on the emitter and cause transistor 70 to conduct. It should be recognized that if the transistor 60 did not conduct, then there would be a negative bias on the emitter of transistor 70 and this transistor could not conduct even if the signals from switches 18-1 and 18-3 were correct.

When transistor 70 conducts it produces a positive going signal at its collector electrode which is applied through a resistor 71 to the base of a transistor 75 which is of an opposite conductivity type (NPN) as compared to the other transistors in the circuit. The positive going signal causes transistor 75 to conduct and the resultant negative going signal on its collector is applied through a resistor 79 to the base transistor 80. These two transistors form a latching circuit which drives a power transistor 90. The negative going signal at the base of transistor 80 causes it to conduct and the resulting positive going signal at its collector is applied back to the base of transistor 75 through resistor 81 thereby maintaining transistor 75 conducting. This is a self latching arrangement which is used to produce an output signal at the collector of transistor 75 for a time greater than the switching time of switches 18 so that a mechanical or electromechanical device can be operated by the output of power transistor 90. This output signal is applied to the base of transistor 90 through a resistor 91. The output signal from the power transistor, which is the accept signal, is used to operate a mechanical, electromechanic, or other electronic device.

While the circuit of FIGURE 2 has been described with respect to PNP transistor circuit components it should be realized that other suitable types of circuit components may be used, for example, vacuum tubes or NPN transistors. The modifications of circuit components and supply voltages necessary for using these components are well known in the art and no further description is necessary. While the invention is illustratively described as using eight photocells, six amplifiers and five switching circuits, any suitable number or arrangement of the same may be used depending upon the type of document to be identified.

The circuit of the present invention is highly accurate and provides several safeguards which aid in the rejection of unacceptable documents. For example, the negative action of switching circuit 18-4 has been described. Also, by the selective placement of the photocells adjacent the testing area other safeguard checks can also be provided. As an example of this, the photocell 10-1 would normally be placed adjacent what would be the most transparent or light reflective area of the document to be tested. For an acceptable document this area would still present some degree of opacity. If a false document having a less opaque area is placed adjacent the photocell 10-1, then the transistor 30-1 would become saturated in response to the light signal and produce a positive output signal which would prevent switch 18-1 from being triggered. Other suitable safeguards and checks may also be provided.

The circuit may also be adapted for identifying two or more types of documents, for example, one dollar and five dollar bills. This can be accomplished by using the same number of photocells, amplifiers and switches, or providing an additional number, and then providing an additional AND type circuit for checking the output of the switches. For example, the one dollar AND circuit would need four positive and one negative assertions to be energized, as described, while the five dollar AND circuit might need two positive and three negative assertions to be energized. The differences are accounted for by the fact that the light output of the five dollar bill would not trigger the same switches as the output from the one dollar bill. Where more photocells and amplifiers are used for greater selectivity, the necessary inputs to the AND circuits would be increased and modified accordingly. Similarly, the circuit can be expanded to identify three or more types of documents. In all cases the idea of comparing two signals at each switch and performing the cross-check of the various points would be retained.

Therefore it can be seen that a novel type of electronic circuit has been provided for use in checking the characteristics of documents by light transmission or reflectance tests. The circuit is rapid acting and can easily be utilized with a system in which the documents are checked while they are moving. The circuit also has great accuracy in accepting a particular type of documents since a number of points of the document under test are cross-checked against other points with one point being cross-checked in several instances against two or more other points. Further it should also be recognized that with the type of comparison used that the polarity of the output signals from the photocell amplifiers are of equal or greater importance than the magnitude of the same. This eliminates the strict dependance upon amplitude comparison which was subject to errors due to aging of components, changes in supply voltage potential, etc., which did not affect all circuits equally and therefore contribute to erroneous results.

Although a particular structure has been described, it should be understood that the scope of the invention should not be considered to be limited by the particular embodiment of the invention shown by way of illustration, but rather by the appended claims.

What is claimed is:

1. A circuit for identifying documents comprising first, second and third light sensing devices located adjacent selected points of a document to be examined for producing respective output signals representative of the light from the document impinging thereon, first, second and third means respectively connected to said first, second and third light sensing devices for producing output signals corresponding to the output signals from the corresponding connected light sensing devices, the output signal from said first means being of a first polarity, the output signal from said second means being of a second polarity and the third device producing output signals of both first and second polarity, first and second switching means, means for applying the output signal of first polarity from the first means and the output signal of second polarity from the third means to the input of the first switching means, means for applying the output signal of second polarity from the second means and the output signal of first polarity from the third means to the input of the second switching means, each said switching means being responsive to the two signals of first and second polarity and producing an output signal when the resultant of the two signals is different from one of said polarities.

2. A circuit as set forth in claim 1 wherein each of said first, second and third means is an amplifier which amplifies the signal applied thereto by a predetermined scale factor.

3. A circuit as set forth in claim 2 wherein means are connected to said first and second switching means for producing an output signal in response to signals from both of said switching means.

4. A circuit for identifying documents comprising a plurality of light sensing devices adapted to be located adjacent selected points of a document to be examined, each light sensing device producing an output signal representative of the amount of light impinging thereon from the document, amplifying means each having a positive output and a negative output connected to each of the light sensing devices for amplifying the output signal of the same by a predetermined amount, connected to first means and second means connected to selected ones of said amplifying means for taking an output signal of first polarity and an output signal of a second polarity, respectively, and a plurality of switching circuits, a respective first and second means of two different amplifying means connected to the input of each switching circuit, a respective switching circuit being responsive to the two input signals of first and second polarity to produce an output signal when the resultant of the two input signals is different from a predetermined one of said polarities.

5. A circuit for identifying documents comprising a plurality of light sensing devices adapted to be located adjacent selected points of a document to be examined, each light sensing device producing an output signal representative of the amount of light impinging thereon from the document, amplifying means each having a positive output and a negative output connected to each of the light sensing devices for amplifying the output signal of the same by a predetermined scale factor, connected to first means and second means connected to selected ones of said amplifying means for taking an output signal of a first polarity and an output signal of a second polarity, respectively, a plurality of switching circuits, a respective first and second means of two different amplifying means connected to the input of each switching circuit, a respective switching circuit being responsive to the two input signals of first and second polarity to produce an output signal when the resultant of the two input signals is different from a predetermined one of said polarities, and means connected to the outputs of the plurality of switching means for checking the output of the switching means and for producing an ouput signal indicating that the document has been identified when predetermined ones of the switching means produce an output signal.

6. A circuit as set forth in claim 5 in which means are provided for producing the signal indicating that the document has been identified only when certain selected switching means of a number less than the total produce output signals.

7. A circuit for identifying documents comprising a plurality of light sensing devices located adajacent selected points of the document to be examined for producing signals corresponding to the amount of light from the document impinging thereon, a respective amplifier having a positive output and a negative output connected to each of the light sensing devices for amplifying the output signals therefrom by a predetermined scale factor, a plurality of means for respectively comparing the output signals from two of the amplifiers, one of said outputs being positive and the other being negative means for applying the output signals from two different amplifiers to each of the comparing means in a predetermined pattern wherein the outputs from selected amplifiers are applied to two or more comparing means, a respective comparing means producing a signal when the comparison indicates that the two signals applied thereto are of a certain magnitude and polarity.

8. A circuit for identifying documents comprising a plurality of light sensing devices located adjacent selected points of the document to be examined for producing signals corresponding to the amount of light from the document impinging thereon, a respective amplifier having a positive output and a negative output connected to each of the light sensing devices for amplifying the output signals therefrom by a predetermined scale factor, a plurality of means for respectively comparing the output signals from two of the amplifiers, one of said output being positive and the other being negative means for applying the output signals from two different amplifiers to each of the comparing means in a predetermined pattern wherein the outputs from selected amplifiers are applied to two or more comparing means, a respective comparing means producing a signal when the comparison indicates that the two signals applied thereto are of a certain magnitude and polarity, and means connected to said comparing means and responsive to signals from selected ones of said comparing means for producing an output signal indicating that the document has been identified.

9. A circuit as set forth in claim 8 wherein said last named means produces an output signal indicating that the document has been identified only in response to signals from less than all of said comparing means.

References Cited by the Examiner

UNITED STATES PATENTS

| | | | |
|---|---|---|---|
| 2,677,815 | 5/1954 | Brustman | 340—213 |
| 2,687,253 | 8/1954 | McMillan | 340—213 |
| 2,731,621 | 1/1956 | Sontheimer | 340—146.3 |
| 2,736,431 | 2/1956 | Coleman et al. | 209—111.7 |
| 2,753,464 | 7/1956 | Stone | 209—111.7 X |
| 2,922,893 | 1/1960 | Ett | 340—149 |
| 2,931,916 | 4/1960 | Sinn | 340—146.3 |
| 2,939,963 | 6/1960 | Rideout | 209—111.7 X |
| 2,941,187 | 6/1960 | Simjian | 340—146.3 |
| 3,005,106 | 10/1961 | Wilkins | 340—146.3 |
| 3,045,364 | 7/1962 | Surber | 340—149 |
| 3,069,653 | 12/1962 | Hirschfeld et al. | 340—213 |

NEIL C. READ, *Primary Examiner.*